US 8,476,555 B2

(12) United States Patent
Diedrick et al.

(10) Patent No.: US 8,476,555 B2
(45) Date of Patent: *Jul. 2, 2013

(54) PORTABLE WELDING WIRE FEED SYSTEM AND METHOD

(75) Inventors: Michael G. Diedrick, Appleton, WI (US); Gregory C. Baeten, Kaukauna, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1195 days.

This patent is subject to a terminal disclaimer.

(21) Appl. No.: 12/201,904

(22) Filed: Aug. 29, 2008

(65) Prior Publication Data

US 2010/0051596 A1 Mar. 4, 2010

(51) Int. Cl.
*B23K 9/12* (2006.01)
*B23K 9/28* (2006.01)

(52) U.S. Cl.
USPC .................................. 219/137.2; 219/137.7

(58) Field of Classification Search
None
See application file for complete search history.

(56) References Cited

U.S. PATENT DOCUMENTS

| | | | | |
|---|---|---|---|---|
| 1,759,373 A | * | 5/1930 | Sarazin | 242/564.4 |
| D148,188 S | | 12/1947 | Robert | |
| 2,833,912 A | * | 5/1958 | Royer | 219/137.9 |
| 3,309,497 A | * | 3/1967 | Kensrue | 219/137.9 |
| 3,433,925 A | * | 3/1969 | Benfield | 219/137.42 |
| 3,480,221 A | | 11/1969 | Sekino | |
| 4,119,830 A | * | 10/1978 | Gilliland | 219/132 |
| 4,182,949 A | | 1/1980 | Powers et al. | |
| 4,465,920 A | | 8/1984 | Hoyt et al. | |
| 4,508,954 A | | 4/1985 | Kroll | |
| 4,703,156 A | * | 10/1987 | Hayes | 219/136 |
| D294,080 S | | 2/1988 | Golia et al. | |
| 4,815,596 A | | 3/1989 | Reid | |
| D333,484 S | | 2/1993 | Neumeister | |
| 5,222,683 A | | 6/1993 | Blackshire | |
| D337,657 S | | 7/1993 | March et al. | |

(Continued)

FOREIGN PATENT DOCUMENTS

| | | |
|---|---|---|
| DE | 2811940 | 9/1979 |
| DE | 19855033 | 5/2000 |

(Continued)

OTHER PUBLICATIONS

U.S. Appl. No. 12/201,959, filed Aug. 29, 2008, Diedrick et al.

(Continued)

*Primary Examiner* — Joseph M Pelham
(74) *Attorney, Agent, or Firm* — Fletcher Yoder P.C.

(57) ABSTRACT

A welding system is provided that includes a wearable wire feeder having a wire drive motor that is responsive to a control signal received directly from a power unit. Another welding system is provided that includes a wearable wire feeder that is configured to couple to a constant voltage power unit and does not include a voltage sensor. Another welding system is provided that includes a power unit, a wearable wire feeder separate from the power unit, a cable extending directly from the power unit to the wearable wire feeder and a welding torch coupled to and separate from the wire feeder. A method is provided that includes receiving a control signal from a power unit at a wearable wire feeder and driving a welding wire from the wearable wire feeder to a welding torch in response to the control signal, wherein the wearable wire feeder is separate from the torch.

25 Claims, 5 Drawing Sheets

U.S. PATENT DOCUMENTS

| | | | |
|---|---|---|---|
| D342,159 S | 12/1993 | Daouk | |
| 5,307,979 A | 5/1994 | Kim | |
| D357,263 S | 4/1995 | Soderholm | |
| 5,403,133 A | 4/1995 | Kim | |
| D386,148 S | 11/1997 | Katooka et al. | |
| 5,734,148 A | 3/1998 | Latvis et al. | |
| D415,614 S | 10/1999 | Akaike et al. | |
| D416,030 S | 11/1999 | Weller et al. | |
| 6,225,596 B1* | 5/2001 | Chandler et al. | 219/130.1 |
| D454,578 S | 3/2002 | Armbruster et al. | |
| D462,519 S | 9/2002 | Gaydos et al. | |
| 6,479,795 B1* | 11/2002 | Albrecht et al. | 219/137.2 |
| D467,257 S | 12/2002 | Andersson et al. | |
| D467,425 S | 12/2002 | Hardigg et al. | |
| D472,384 S | 4/2003 | Richardson | |
| 6,705,563 B2* | 3/2004 | Luo et al. | 242/557 |
| 6,818,860 B1* | 11/2004 | Stava et al. | 219/130.1 |
| 6,855,914 B1 | 2/2005 | Kaufman et al. | |
| 6,888,099 B1 | 5/2005 | Schneider | |
| 7,023,101 B2 | 4/2006 | Wang | |
| D520,237 S | 5/2006 | Cheng | |
| D523,242 S | 6/2006 | Hardigg et al. | |
| 7,126,084 B2* | 10/2006 | DeYoung | 219/136 |
| 7,208,699 B2 | 4/2007 | Stanzel | |
| 7,411,147 B2* | 8/2008 | Stanzel et al. | 219/74 |
| 7,423,238 B2* | 9/2008 | Stanzel et al. | 219/137.2 |
| 7,427,726 B2* | 9/2008 | Enyedy et al. | 219/136 |
| 7,429,712 B2* | 9/2008 | Stanzel et al. | 219/74 |
| D611,074 S | 3/2010 | Bashore et al. | |
| 2003/0052109 A1 | 3/2003 | Hayes | |
| 2004/0015258 A1 | 1/2004 | Hayes | |
| 2005/0016797 A1 | 1/2005 | Reynolds et al. | |
| 2005/0067396 A1 | 3/2005 | Kaufman et al. | |
| 2005/0087523 A1* | 4/2005 | Zucker et al. | 219/132 |
| 2006/0027546 A1* | 2/2006 | Reynolds et al. | 219/132 |
| 2006/0027547 A1 | 2/2006 | Silvestro | |
| 2006/0070986 A1* | 4/2006 | Ihde et al. | 219/137.71 |
| 2006/0076335 A1 | 4/2006 | Reynolds et al. | |
| 2006/0169685 A1 | 8/2006 | Stanzel | |
| 2006/0201923 A1* | 9/2006 | Hutchison | 219/137.71 |
| 2006/0207981 A1* | 9/2006 | Diekmann et al. | 219/137.2 |
| 2006/0278623 A1* | 12/2006 | Christopher et al. | 219/137.7 |
| 2006/0278624 A1* | 12/2006 | Christopher et al. | 219/137.7 |
| 2007/0108174 A1 | 5/2007 | Narayanan et al. | |
| 2007/0158313 A1 | 7/2007 | Stanzel | |
| 2008/0047522 A1 | 2/2008 | Leisner et al. | |
| 2008/0073330 A1 | 3/2008 | Diedrick et al. | |
| 2008/0149611 A1* | 6/2008 | Roth et al. | 219/137.7 |
| 2008/0156783 A1* | 7/2008 | Vanden Heuvel et al. | 219/137.2 |
| 2010/0051595 A1* | 3/2010 | Diedrick et al. | 219/137 R |

FOREIGN PATENT DOCUMENTS

| | | |
|---|---|---|
| GB | 2264924 | 9/1993 |
| WO | WO0076709 | 12/2000 |
| WO | WO2005/107993 | 11/2005 |
| WO | WO2005107993 | 11/2005 |

OTHER PUBLICATIONS

OXOMATIC 1; Admitted Prior Art; Date: unknown.
OXOMATIC 2; Admitted Prior Art; Date: unknown.
OXOMATIC 3; Admitted Prior Art; Date: unknown.
Glenn, R. "Broco Inc.'s GOWELDO; Portable Mig Welder" Jul. 1, 2003. Internet document downloaded from http://www.off-road.com/ on Sep. 23, 2008. Paragraph 4, Photographs 1, 2, 3.
Millermatic Passport and M-10 Gun; Owner's Manual; OM-1328 220 073U; Miller, Jul. 2007.
Millermatic Passport and M-10 Gun; Owner's Manual; OM-1328 220 073L; Miller, Aug. 2005.
Miller Electric Mfg Co.,; Millermatic 140; www.MillerWelds.com; Issued Sep. 2006, Index No. DC/12.43.
Miller Electric Mfg Co.; SuitCase 8RC and 12RC; www.MillerWelds.com; Issud Jan. 2007, Index No. M/6.5.
Miller Electric Mfg Co.; Millermatic Passport; www.MillerWelds.com; Issued Feb. 2007, Index No. DC/12.53.
OXOMATIC 1; Prior Art; Date: unknown.
OXOMATIC 2; Prior Art; Date: unknown.
OXOMATIC 3; Prior Art; Date: unknown.

\* cited by examiner

PORTABLE WELDING WIRE FEED SYSTEM AND METHOD

BACKGROUND

The invention relates generally to portable welding systems. More specifically, embodiments of the invention relate to a wearable wire feeder having various components integrally mounted inside a wearable unit.

Portable welding systems may be used in field applications where it is not practical or convenient to send a work piece to a welding shop for repair or fabrication. These welding systems find applications in the farming and ranching industry and in a variety of other settings. To provide the welding functionality, a welding wire feeder may be used to feed a welding wire through a torch to a molten weld location in front of the tip of the torch. In many applications, it may be desirable to move the wire feeder to a remote location or to a different location in a work area. Otherwise, the wire feeder may be required to drive the wire over an unnecessarily long run of conduit to the particular location. As a result, the wire feeder may require a more robust and expensive drive mechanism.

Unfortunately, conventional wire feeders are designed as stationary devices intended to remain within a particular work area. Additionally, conventional portable wire feeders can be difficult or impossible to carry in areas requiring one or both hands of the user. Some wire feeders may be integrated into the welding torch, such as "push-pull" or "self-contained" wire feed torches. However, these wire feeders and torches may result in a bulky and heavy torch that is difficult to hold, maneuver, and weld in certain locations, and the wire feeder torches may be up to 10 to 15 feet in length. Some wire feeders may include control circuitry to provide control of the various parameters of the wire feeder and the torch, such as weld power, wire feed speed, etc. The wire feed mechanisms and control circuitry in these wire feeders may also add cost and manufacturing complexities.

Additionally, wire welders, conventional portable wire feeders, or the torch and wire feeder units, may be too heavy or bulky to move effectively. For example, if the user attempts to move along stairs, ladders, steep inclines, or across a farm or other unpaved surface, then the user may need to grab the welding equipment with both hands, hold on to a rail or other support, or seek assistance to move the unit. Wire welders may also require an additional cart or a long extension cord to reach some locations.

BRIEF DESCRIPTION

In one embodiment, a welding system is provided that includes a portable wire feeder. The feeder includes a support for a spool of welding wire, and a wire feed drive motor for driving the spool in response to a control signal received from wire feed control circuitry in a power unit. A welding torch is coupled to the wire feeder by a cable. The torch is controllable to generate a signal for the control circuitry to cause the control circuitry to drive the motor and thereby to feed welding wire to the torch for a welding operation.

The system may also include a welding power supply. The power supply may include the control circuitry for the portable wire feeder. Moreover, the power supply may itself include a wire feeder, such as an integrated wire feeder. Both the integrated wire feeder and the portable wire feeder may be driven by the same control circuitry. In such arrangements, a switch may be provided for switching between provision of the control signals to the integrated wire feeder and the portable wire.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
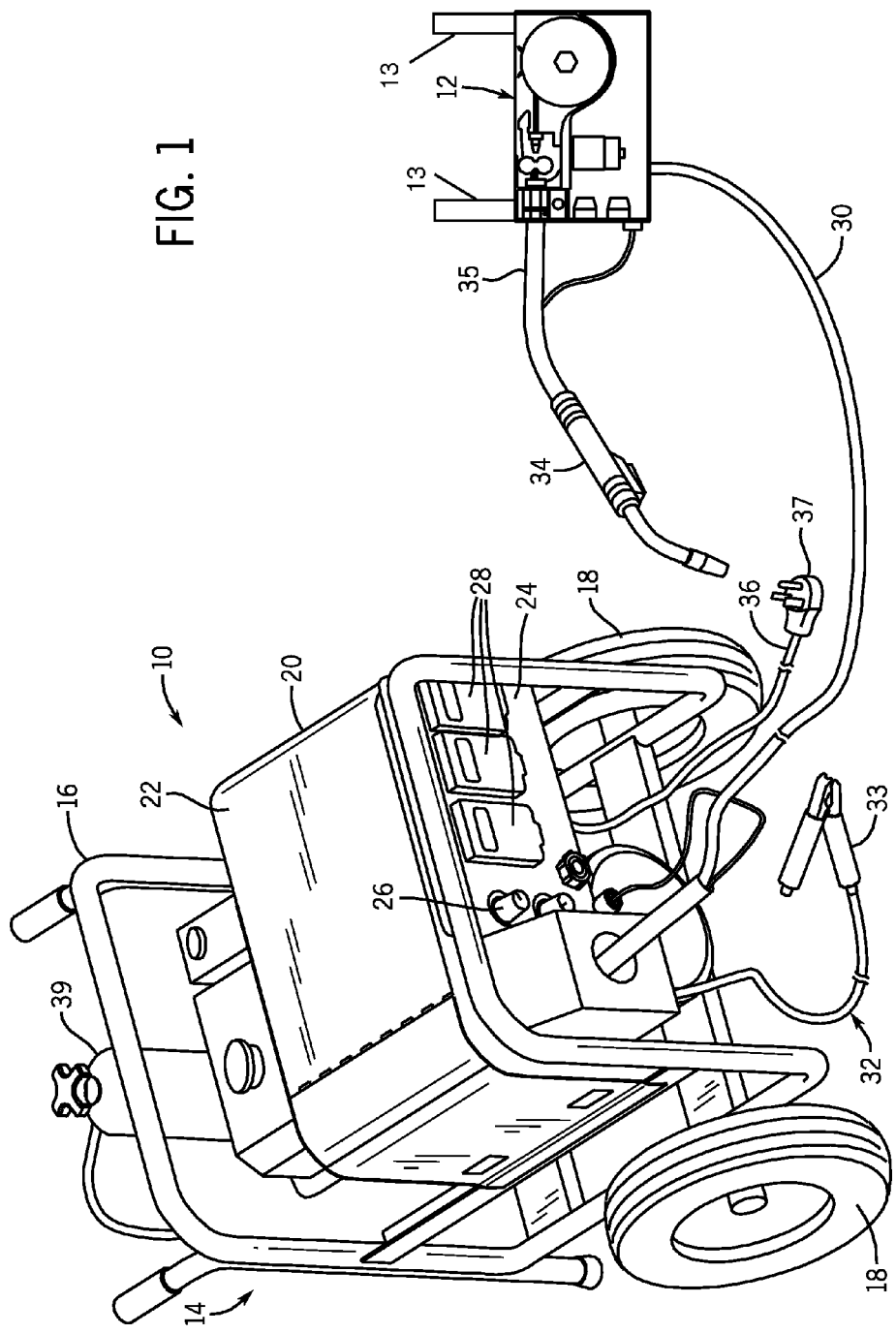
FIG. 1 is a perspective view of a wearable wire feeder coupled to a portable engine-driven welding system in accordance with an embodiment of the present invention.

FIG. 1 is a perspective view of a portable engine-driven welding system 10 coupled to a wearable wire feeder 12 in accordance with an embodiment of the present invention. The illustrated system 10 is a metal inert gas (MIG) welding system, although other welding systems may utilize the wearable wire feeder 12 discussed below. As illustrated in FIG. 1, welding system 10 may include a cart or other portable assembly, as indicated generally by reference numeral 14. In the illustrated embodiment, the cart 14 has a tubular frame 16 with wheels 18 for easily moving the cart 14 from place to place. The components described in FIG. 1 and discussed below are generally mounted in an enclosure 20 comprising a number of panels 22 which can be removed or displaced to access the components within the cart 14. A front panel 24 includes various controls and cable connections. The front panel 24 includes a control panel 26 where the various adjustments can be made for setting the regime of the control circuitry, where provided, as well as various welding settings. Moreover, as illustrated in FIG. 1, the front panel 24 includes a number of receptacles 28, shown covered by optional covers in the figure, which allow for plug-in connection of power tools, lights, and other devices. In a presently contemplated embodiment, electrical service is provided in the front panel at 60 Hz, 120V, and 240V.

In general, the system can provides welding resources to a power/control cable 30 and to a ground cable 32. The ground cable 32 is coupled to a ground clamp 33 which may be attached to a work piece. The power/control cable 30 is coupled to the wearable wire feeder 12, which in turn is coupled to a welding torch 34 (e.g., the welding gun) having a torch cable 35. In one embodiment, the power/control cable 30 may be about 15 to about 50 feet, and the welding torch 34 and cable 35 may be about 3 to about 5 ft. Thus, the cable 35 is relatively short as compared to a conventional wire feeder. In operation, a welding operator contacts an electrode in the welding torch 34 with the work piece to complete an electrical circuit, and thereby creating an arc used to melt metal and perform the welding operation.

The close proximity of the wearable wire feeder 12 to the operator (i.e., mounted on operator), the torch 34, and the weld location enables the operator more freedom to weld at remote locations. The short distance between the wire feeder 12 and torch 34 also enables use of smaller welding wire, a smaller wire feed drive, and so forth. The short distance of the cable 35 reduces the weight associated with the cable 35. Further, there is less weight in the power/control cable 30 because it does not include welding wire. Additionally, the welding operation is not limited to the position of the wire feeder 12, because the wire feeder 12 is always with the operator.

While reference will be made in the present discussion to MIG welding torches and to MIG welding in general, it should be borne in mind that the welding system 10, while including a wire feeder 12 for performing MIG welding operations, is not necessarily limited to such operations. In certain embodiments, the power supply and power control circuitry described below may be designed for constant voltage power control regimes only. However, other embodiments may not be limited to constant voltage operation.

The system 10 illustrated in FIG. 1 has an engine-driven power supply that generally includes an engine and a generator, as discussed below with reference to FIG. 4. In the illustrated embodiment, the system 10 having the engine and generator set form a compact and portable unit having a small footprint that occupies little space at the welding location, and can be transported by a single operator. In one embodiment, the system 10 uses a single-cylinder gasoline engine, such as a 10-40 HP engine running at a nominal speed of 1800 or 3600 RPM. However, the system 10 may utilize a variety of spark ignition engines or compression ignition (e.g., diesel) engines having one or more cylinders. The system 10 may also include an appropriate fuel tank for supplying necessary fuel for running the engine. In certain embodiments, the engine may include an air-cooling system, a liquid-cooling system, or both. The engine directly drives a generator which, in one embodiment, has a rated power output of either 4500 Watts peak, 4000 Watts continuous, or 6000 Watts peak, 5500 Watts continuous power output. As with the engine, however, other suitable generators and power ratings may be used in the system 10. Alternatively, the system 10 may be coupled to a power outlet by a power cord 36 and plug 37.

As mentioned above, the wearable wire feeder 12 is coupled to the welding system 10 by a power/control cable 30. As described in more detail with reference to FIG. 4, the power/control cable 30 may supply power, control signals, and gas to the wearable wire feeder 12, and control circuitry in the welding system 10 may send control of the wire feed and other welding parameters to the wire feeder 12. In certain embodiments, the power/control cable 30 provides a direct connection for the system 10 to the wire feeder 12. Thus, in such an embodiment, the power/control cable 30 does not include any intermediate control circuitry or the like. In this embodiment, the wire feeder 12 may not contain any voltage-sensing boards or circuits, as the welding system 10 may provide a constant voltage for welding via power/control cable 30. The system 10 may also be coupled to a gas source, such as gas cylinder 39 to provide shielding gas for the welding operation. Thus, the wire feeder 12 also may include features, such as gas conduit, regulators, valves, and controls, for routing the gas to the welding torch 34.

Advantageously, to facilitate portable welding in small locations, a user may wear the wearable wire feeder 12 as a fanny pack, a shoulder pack, etc., thus freeing both of the user's hands. The wire feeder 12 may be mounted to a user's belt, thigh, shoulder, or any other location by straps, loops, clasps, or any suitable mounting mechanism 13. For example, as a shoulder pack, the wire feeder 12 may include a strap 13 that mounts over the user's shoulder. The engine-driven welding system 10 may also be moved on wheels 18 to a suitable location, allowing a user to reach welds in remote or difficult to reach areas.

Figure 2:
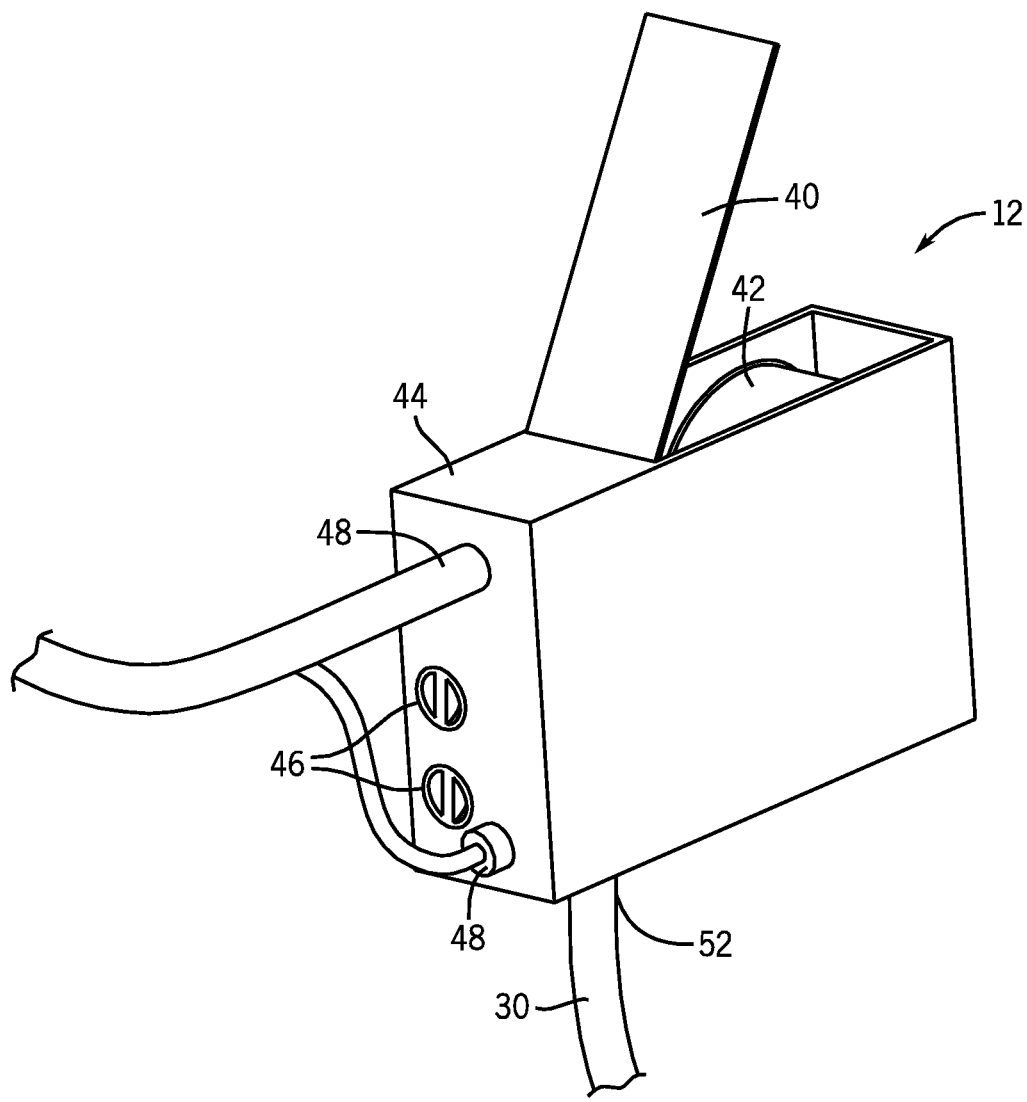
FIG. 2 is a perspective view of the wearable wire feeder of FIG. 1 in accordance with an embodiment of the present invention.

Turning now in more detail to the wire feeder 12, FIG. 2 depicts a perspective view of the wire feeder 12 having a panel 40 that is open to expose a wire spool 42. The panel 40 may be hinged or otherwise removable to allow insertion and removal of the wire spool 42. In one embodiment, the wire feeder 12 may be configured to receive up to about a 2 lb wire spool. The top panel 40 may be secured to the housing 44 of the wire feed 12 by a mechanical or magnetic clasp, a lock, or any suitable mechanism. In one embodiment, the housing 44 may be manufactured from molded plastic. In other embodiments, the housing 44 may be manufactured from a composite or any other suitable material. For example, in an embodiment the housing 44 may be made entirely or consist essentially of plastic, composite, carbon fiber, fiberglass, other non-metallic materials. In other embodiments, the housing 44 may consist essentially of a combination of materials, such as plastic and composites, plastic and other nonmetallic materials, etc.

The housing 44 of the wire feeder 12 may also include one or more user inputs, such as controls and/or dials 46, which may enable a user to control the rate of adjustment of the wire feed speed or other suitable parameters of the wire feeder 12. For example, the dials 46 may include wire speed, gas flow rate, welding voltage/current, and so forth. In addition to the dials 46, the wire feeder 12 may include other control features, such as switches, keypads, and displays. The displays may include digital and/or analog displays of wire speed, gas flow rate, welding current, and so forth. As mentioned above, the wire feeder 12 receives power and control signals from the system 10 via the power/control cable 30. Thus, in some embodiments, the wire feeder 12 may have only limited or no control features. The front of the wire feeder may also include one or more connections 48 to the welding torch 34. The wire feeder 12 may also include a connection 52 for to the power/control cable 30 that couples the wire feeder 12 to the welding system 10. In some embodiments, the connection 52 may be unique so that only a specific welding system may be used with the wearable wire feeder 12.

Figure 3:
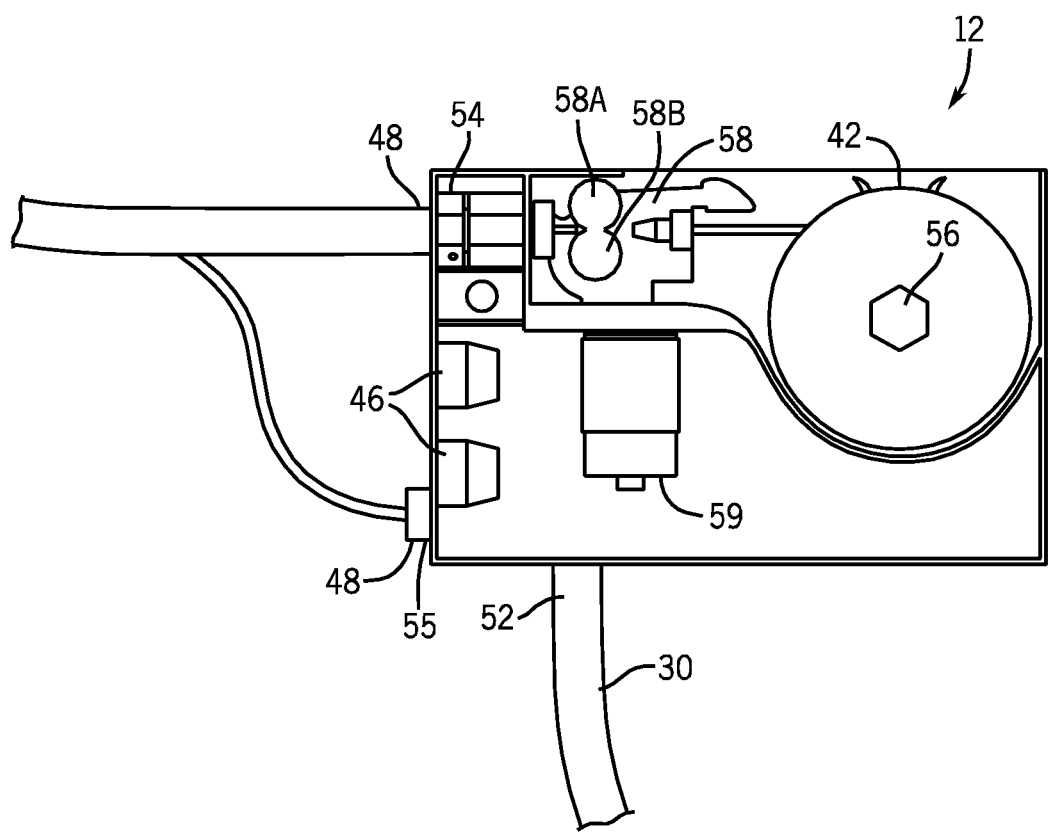
FIG. 3 is a cut-away side view of the wearable wire feeder of FIGS. 1 and 2 in accordance with an embodiment of the present invention.

FIG. 3 is a cutaway view of the wire feeder 12 illustrating various internal components. As mentioned above, the wire feeder 12 may include controls such as controls 46, the connections 48 to the welding torch, and the connection 52 to the welding system 10 via power/control cable 30. The connections 48 may include a power plug 54 and a multi-pin connector 55. The wire feeder 12 may include a wire spool mount 56, such as a rotating shaft, nut, lock ring, other suitable mount, or any combination thereof. To supply wire to the torch 34, the wire feeder 12 may include a wire drive 58 that feeds the wire out to the torch 34. In the illustrated embodiment, the wire drive 58 includes a pair of facing drive wheels 58A and 58B, which compressively fit about and drive the welding wire in response to rotation provided by a motor. As discussed further below, the wire drive 58 may be controlled in response to a control signal received from the welding system 10 through the power/control cable 30. Additionally, the wire drive 58 receives power from the welding system 10 through power/control cable 30. Thus, in certain embodiments, no control circuits or other control of the wire drive motor 58 or other welding parameters are included in the wire feeder 12. Advantageously, eliminating the control circuitry, interface, or control elements from the wire feeder 12 reduces the size, cost, and weight of the wire feeder, thus allowing greater portability. Moreover, as discussed above, the short length of the cable 35 (see FIG. 1) due to the close proximity of the feeder 12 (i.e., worn by the user) enables use of smaller, less powerful, more lightweight, and less expensive components of the wire drive 58.

The wire feeder 12 also could include a potentiometer 59, which is connected to one of the controls 46 so a user can adjust the motor speed 59. In one embodiment, the potentiometer 46 may be used to change the rate of adjustment of the wire feed speed. For example, the potentiometer 59, and thus the adjustment of the wire feed speed, may be set so that a user-selected target arc length and heat input is maintained at the weld.

Figure 4:
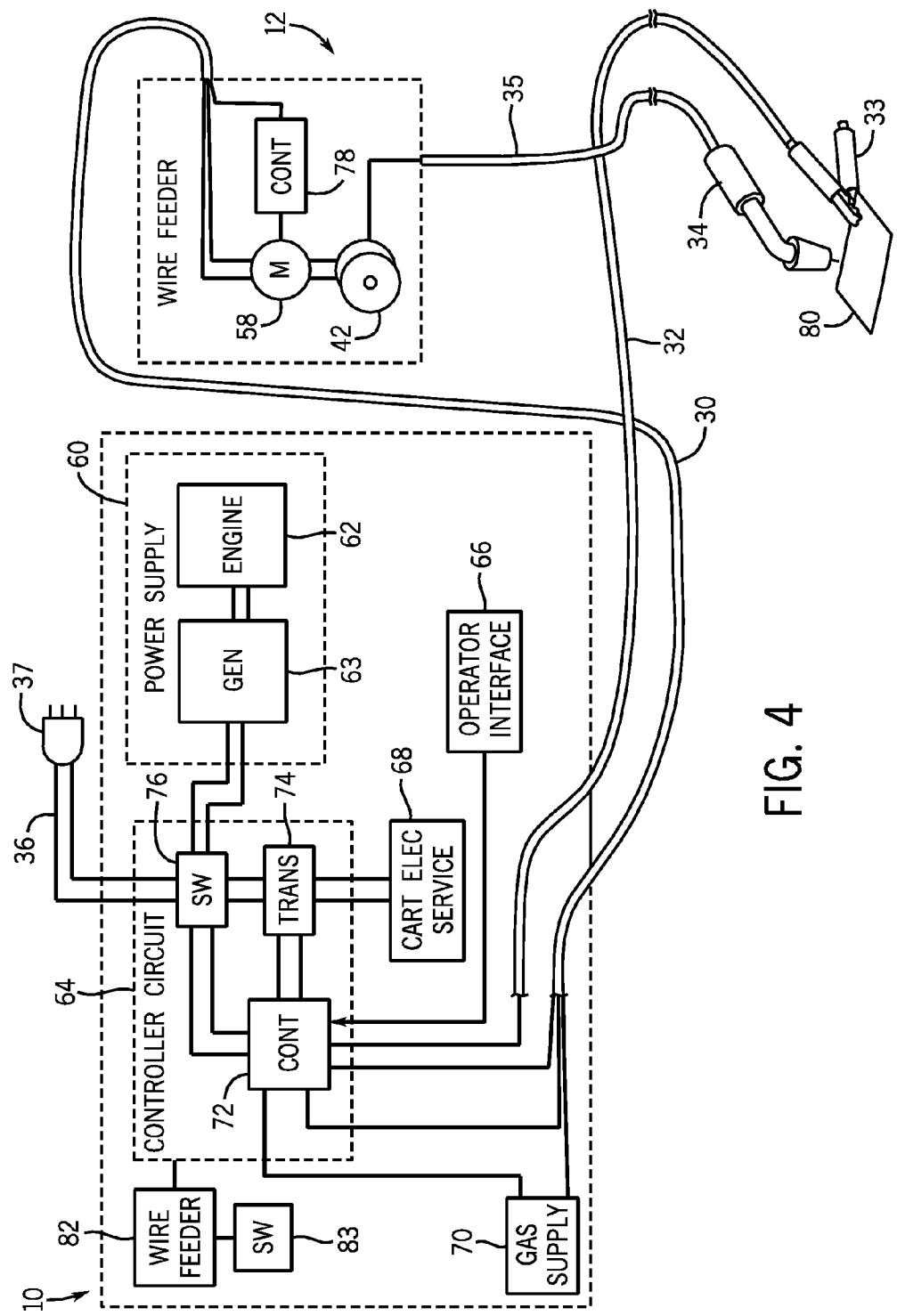
FIG. 4 is a block diagram of a wearable wire feeder coupled to a portable engine-driven welding system in accordance with an embodiment of the present invention.

FIG. 4 is a block diagram illustrating an embodiment of the welding system 10 and the wire feeder 12. Various internal components of the welding system are further illustrated, such as a power supply 60 that includes an engine 62 and generator 63, a controller circuit 64, an operator interface 66, a cart electric service 68, and a gas supply 70. The controller circuit 64 may include a contactor control 72, a transformer 74, and a switch 76. The components may be included in a system of the type illustrated in FIG. 1 and described above. That is, the system may include a wire feeder (with any associated spool, motor drive, gearing and so forth) in a base unit and power supply. A system of this type is available commercially from Miller Electric Mfg. of Appleton, Wis., under the commercial designation Renegade. The presence of a wire feed control circuit, discussed above, in such systems permits very straightforward interfacing of the remote wire feeder without the need for duplication of control circuitry. That is, the same circuitry used to power and control the in-unit wire feeder may provide power and feed speed control signals to the remote wire feeder. At the same time, it should be recognized that other systems may be provided in which control circuitry is provided in a power supply without an integrated wire feeder, and even without other welding support equipment other than the power supply and wire feeder control circuitry. Such systems may provide, for example, a DC power source and wire feed control signals for the remote unit. Moreover, such systems need not be engine driven, but may be driven by connections to the power grid or by batteries.

It should also be noted that, when a power supply is used that does include a separate or integrated wire feeder, and the same control circuitry is to be used for regulating operation of the remote wire feeder, one or more switches may be provided for effecting the transition from use of one wire feeder to another. For example, a switch may deactivate the internal or integrated wire feeder and allow control signals to be provided to the remote wire feeder. Such switching devices may be manual or automatic. Thus, for example, where a user desires to plug the remote wire feeder into the power supply, the power supply may recognize that the remote wire feeder is present and operative, and send signals to the remote wire feeder rather than the internal or integrated wire feeder. Here again, such control may be simply mechanical or electromechanical in nature (e.g., a toggle switch), or may be based upon a digital control algorithm (e.g., sensing presence of the remote wire feeder and altering application of wire feed control signals appropriately).

The wire feeder 12 may be coupled to the welding system 10 by the power/control cable 30, as discussed above, thus coupling the wire feeder 12 to the controller circuit 64. The wire feeder 12 may receive power and a control signal from the controller circuit 64. The wire feeder 12 may include a controller 78, such as the potentiometer 59, for regulating the rate of adjustment of the wire feed speed received from controller circuit 64. For example, the controller 78 may allow for operator control of the feed speed of the wire electrode, or the speed may be regulated as a function of other process variables controlled by the control circuitry 64. Such variables may include, for example, the current applied to the welding torch by the contactor control 72. In one embodiment, a user may adjust the controller 78 via one of the controls 46 on the housing of the wire feeder 12. The controller 78 may respond to the change in resistance of the potentiometer 59 and control the wire feed speed based on the change.

The switch 76 may be coupled to an output from the generator 63 to enable the controller circuit 64 and the welding system 10 in general to operate alternatively from grid power or another external power supply. Thus, the power cable 36 may also be routed to the switch 76. Operation of the switch 76 may then reconnect the controller circuit 64, wire feeder 12, and in general the system 10 from the power supply 60 to a power grid or external power via the power cable 36. In certain configurations, arrangements other than an integrated cable or cord may be made for providing power to the system, such as plug receptacles that receive a separate power cord plug.

The controller circuit 64 may also include the transformer 72 to aid in adjusting the voltage supplied to various components. For example, the transformer 72 may adjust the voltage received from the power supply before output to the cart electrical service 68 and the receptacles 28 on the front of the system 10, so that power tools or other accessories may be coupled to the system 10 and use auxiliary power.

Power from generator 63 may be conditioned by the controller circuit 64 and the contactor control 72. In general, the controller circuit 64 may include a converter which smoothes and conditions the power output by the generator, and may transform power to one or more output levels. In certain embodiments, the converter includes a center tap coil that enables 120V and 240V service output for lamps, power tools, and so forth. Other conversion techniques may, of course, be provided for auxiliary power. In some embodiments, the controller circuit 64 allows for operation both from the grid as well as by output of the engine-drive generator 63. For example, an operator may perform welding operations while coupled to the power grid via power cable 36, while running engine 62 for providing output power service locally, such as for lights or power tools. Alternatively, the controller circuit 64 may permit either grid power or engine-generated power solely.

The generator 63 may convert the power output (e.g., mechanical energy) of the engine 62 to an electrical power. Generally, the generator 63 includes a device configured to convert a rotating magnetic field into an electrical current (e.g., AC generator). The generator 63 includes a rotor (rotating portion of the generator) and a stator (the stationary portion of the generator). For example, the rotor of the generator 63 may include a rotating drive shaft disposed in a single stator configured to create an electrical current (e.g., welding current) from the rotation of the magnetic field. In an embodiment, the generator 63 may include a four-pole rotor and three-phase weld output configured to provide beneficial welding characteristics. Further, the generator 63 may include a plurality of independent winding sections in the rotors and/or stators, such that the generator 63 is configured to output multiple electrical outputs having different characteristics. For example, the generator 63 may include a first section configured to drive a welding current to a welder, and a second section configured to power auxiliary devices.

Within the control circuitry, the electrical output of the generator may be provided to a rectifier, which produces rectified DC power. The rectified DC power is provided to controller circuit 64, which may include, as in a presently contemplated embodiment, at least one energy storage device such as a capacitor for smoothing the ripple in the rectified signal to provide a DC bus. An alternative embodiment may use a DC generator instead of AC generator and rectifier, or the rectifier may be part of the generator, or between the generator and the converter.

Controller circuit 64 may also include an inverter and rectifier that convert the smoothed and rectified DC signal to a welding output (having an appropriate current and voltage). For example, controller circuit 64 may provide welding current selectable by the operator. Various control functions including a hot start and a protection system may also be provided.

The welding system 10 illustrated in FIG. 4 may also include the operator interface 66, which may provide for the control panel 26 having switches and dials or knobs for setting the various operational parameters of the system. For example, the operator interface 66 may allow for setting the type of welding operation to be performed (e.g., MIG), as well as currents or voltages desired, wire feed speed, and other welding operating parameters. Where the feed speed of wire electrode is not automatically controlled by controller circuit 64, the operator interface may also permit manual setting of the electrode feed speed.

As discussed above, the wire feeder 12 may include the wire drive 58 that drives the wire spool 42 to advance welding wire to the torch 34. The welding wire, for MIG welding, is fed into the torch 34 along with one of two power conductors coupled to the contactor control. Another of the conductors is coupled to the ground cable 32 to complete the electrical circuit through a work piece 80. The system 10 may also be provided with the optional gas supply 70, such as gas cylinder 39, to provide an inert gas used for shielding of the weld. Where a flux core wire electrode is used in MIG welding, such gas supplies may not be required. The gas supply 70 may be controlled by the controller circuit 64, and may include various control mechanisms, such as gas solenoids, valves, etc. For example, in one embodiment, the gas solenoid may be controlled by the controller circuit 64 via a remote switch on the welding torch 34. In an alternative embodiment, a gas purge switch may be provided on the on the feeder 12.

In some embodiments, the welding system 10 may include an on-board wire feeder 82 integrated into the unit so that no additional wire feeder is needed for welding. In such an embodiment, the welding system 10 may include a switch 83 to disable or enable the on-board wire feeder 82 of the system 10 so that an external wire feeder, such as the wearable wire feeder 12, may be used.

The power/control cable 30 may provide various functions including a multi-conductor control cable, a heavy weld cable, and a shielding gas line. For example, in one embodiment, the power/control cable 30 may include a gas line, a weld power line, two contactor closure wires for weld power and gas, and two drive motor power wires. The power/control cable 30 may also include or consist essentially of a 4-wire control cable that includes two wire feed control wires and two voltage control wires. In one embodiment, for a power/control cable of about 50 feet, the weld power line may be 3 gauge wire. In another embodiment, for a power/control cable of about 30 feet, the weld power line may be 4 gauge wire. Additionally, in some embodiments, the power/control cable 30 may include a work lead. It should be noted, however, that the length of cable is generally only limited by the voltage drop for welding power. In many practical applications, such as for maintenance, repair, shipyard work, welding while on man lifts, and similar tasks, the power supply may be positionable sufficiently close to the application such that the run length of the power cable may be kept reasonably short (e.g., within 50 feet).

Advantageously, as discussed above, by locating the controller circuit 64 on the welding system 10, the wearable wire feeder 12 may be lighter, smaller, less bulky, and less expensive to manufacture. Further, the portability of the welding system 10 and the length of power/control cable 30 may increase the range of the welding system 10 and provide for welding in locations away from a power grid or in hard to reach areas. The short distance between the worn wire feeder 12 and the torch 34 may provide the ability to reach welds in difficult or small areas and may permit aluminum welding.

Figure 5:
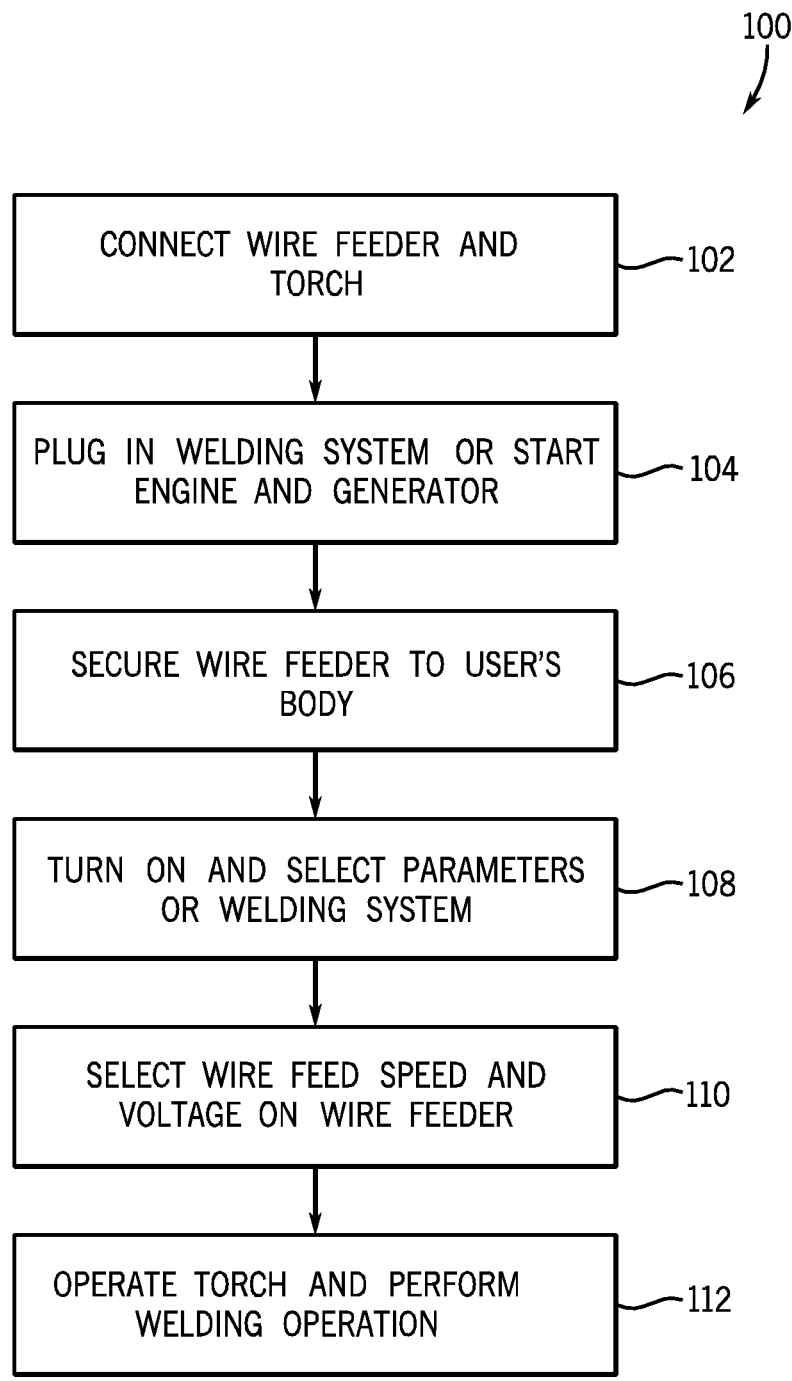
FIG. 5 illustrates a process for operating the wearable wire feeder coupled to a portable engine-driven welding system in accordance with an embodiment of the present invention.

Referring now to FIG. 5, a process 100 for operating the welding system 10 and wearable wire feeder 12 is shown. Beginning with block 102, a user may first connect the wearable wire feeder 12 to the welding system 10, such as by power/control cable 30, and may connect the welding torch 34 to the wearable wire feeder 12. The user may also connect the ground clamp 33 to the material to be welded.

To generate power, the user may plug the welding system 10 into an electrical outlet using power cable 36, or if greater portability or range is desired, may alternatively or additionally activate the engine 63 and generator 62 of the system 10 (block 104). The user may then secure the wearable wire feeder 12 to the user's body to allow hands-free use of the wire feeder (block 106). It may be advantageous for the user to wear the wire feeder 12, such as by strapping 13 the wire feeder 12 around the user's waist as a fanny pack or wearing the wire feeder 12 over the user's shoulder.

After power is available, either from the grid or generated by the power supply 60, the user may then turn on and select the various operating parameters of the welding system 10, such as voltage, gas, wire feed, etc (block 108). As stated above, selection of such parameters enables the controller circuit 64 to pass the control signals to the wire feeder 12 and control the wire feed, gas supply, and welding power to the torch 34.

The user may select an appropriate wire feed speed adjustment and/or voltage using the controls 46 on the wearing wire feeder 12 (block 110), thus allowing the user to be remote from the welding system 10 when initiating or adjusting the welding process. For example, the rate of adjustment of the wire feed speed may be based on a setup parameter chart so that to maintain a selected target arc length and heat input at the weld. Further, by wearing the wire feeder 12 and freeing up both hands, the user may be able to use hands for support, movement, and adjustment of the wire feeder 12 and operation of the torch 34. Once all adjustments have been made to the user's preferences, the user may operate the torch 34 by depressing a trigger or other switch on the torch 34 and then perform the welding operation (block 112).

In summary, the system described above allows for a base unit, containing a power supply, to be easily coupled to welding components, including a remote wire feeder, a welding torch, and a short run of cable between the wire feeder and welding torch. The remote wire feeder is coupled to the power supply by a longer run of cable that provides welding power and wire feed signals for the wire feeder. Control circuitry for generating the wire feed signals is provided in the power supply and need not be duplicated in the remote wire feeder. The remote wire feeder may be a simple as a motor, any needed drive linkages, and a spool of welding wire. A trigger on the welding torch causes a signal to be sent to the control circuitry that, in turn, causes the wire feeder to drive wire to the torch. On the other hand, certain controls, such as wire feed speed, voltage, and so forth, may be provided on the remote wire feeder. These may be controlled by the user via dials, knobs, buttons or any other control input interface. In many or most applications, the wire feeder will be designed to be worn such that the welder may conveniently work without the need to more, carry, or drag the wire feeder between welding locations.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system comprising:
    a wearable wire feeder, comprising:
        a user mount configured to enable a user to wear the wearable wire feeder;
        a spool support configured to support a spool of welding wire; and
        a wire feed drive motor configured to drive the spool in response to a control signal received from wire feed control circuitry in a power unit, wherein the wire feed control circuitry is configured to selectively control the wearable wire feeder and a second wire feeder separate from the wearable wire feeder.

2. The system of claim 1, wherein the wearable wire feeder includes a user adjustable input configured to regulate a speed of advancement of the welding wire on the spool from the wearable wire feeder to a welding torch.

3. The system of claim 1, wherein the wearable wire feeder includes a user adjustable input configured to regulate a welding power voltage supplied to a welding torch by the power unit.

4. The system of claim 1, wherein the wearable wire feeder is configured to be worn by a user in a hands free manner during welding operations.

5. The system of claim 1, comprising the power unit, wherein the power unit is a constant voltage power unit having a control unit configured to output the control signal.

6. The system of claim 5, wherein the constant voltage power unit is directly coupled to the wearable wire feeder via a cable.

7. The system of claim 5, wherein the second wire feeder is integral with the constant voltage power unit.

8. The system of claim 7, wherein the constant voltage power unit includes a switch configured to activate or deactivate the second wire feeder when the wearable wire feeder is coupled to the constant voltage power unit.

9. The system of claim 8, wherein the constant voltage power unit is configured to sense that the wearable wire feeder is coupled to the constant voltage power unit and to effect switching of operation from the second wire feeder to the wearable wire feeder when the wearable wire feeder is coupled to the constant voltage power unit.

10. The system of claim 1, wherein the spool support is configured to support the spool of welding wire with a diameter of approximately 4 inches.

11. The system of claim 1, wherein the wearable wire feeder comprises a housing consisting essentially of a plastic, a composite, or a combination thereof.

12. The system of claim 1, comprising a welding torch configured to couple to the wearable wire feeder by a cable, wherein the welding torch is controllable to generate a signal for the wire feed control circuitry to cause the wire feed control circuitry to drive the wire feed drive motor and thereby to feed the welding wire from the spool to the welding torch for a welding operation.

13. A welding system, comprising:
    a welding power supply including control circuitry configured to selectively control a plurality of wire feeders, wherein the control circuitry is configured to regulate a speed of advancement of a welding wire from each wire feeder;
    a portable wire feeder configured to couple to the welding power supply via a first welding cable and configured to couple to a welding torch via a second welding cable, wherein the portable wire feeder comprises:
        a spool support configured to support a spool of welding wire; and
        a wire feed drive motor configured to drive the spool in response to a control signal received from the control circuitry in the welding power supply.

14. The system of claim 13, wherein the portable wire feeder includes a user adjustable input configured to regulate the speed of advancement of the welding wire from the portable wire feeder to the welding torch.

15. The system of claim 13, wherein the portable wire feeder includes a user adjustable input configured to regulate a welding power voltage supplied to the welding torch by the welding power supply.

16. The system of claim 13, wherein the welding power supply comprises an integral wire feeder and a switch configured to switch application of control signals between the portable wire feeder and the integral wire feeder when the portable wire feeder is coupled to the welding power supply.

17. The system of claim 13, comprising a welding torch configured to couple to the portable wire feeder by a cable, wherein the welding torch is controllable to generate a signal for the control circuitry to cause the control circuitry to drive the wire feed drive motor and thereby to feed the welding wire from the portable wire feeder to the welding torch for a welding operation.

18. A welding system, comprising:
    a welding power supply comprising wire feed control circuitry and an integral wire feeder;
    a portable wire feeder configured to couple to the welding power supply via a welding cable, wherein the wire feed control circuitry is configured to control the integral wire feeder and the portable wire feeder to regulate at least a speed of welding wire advancement, the portable wire feeder comprises a spool support configured to support a spool of welding wire, and the portable wire feeder comprises a wire feed drive motor configured to drive the spool in response to a control signal received from the wire feed control circuitry; and
    a welding torch configured to couple to the portable wire feeder by a cable, wherein the welding torch is controllable to generate a signal for the wire feed control circuitry to cause the wire feed control circuitry to drive the wire feed drive motor and thereby to feed the welding wire from the spool to the welding torch for a welding operation.

19. The system of claim 18, wherein the portable wire feeder includes a user adjustable input configured to regulate the speed of welding wire advancement of the welding wire from the portable wire feeder to the welding torch.

20. The system of claim 18, wherein the portable wire feeder includes a user adjustable input configured to regulate a welding power voltage supplied to the welding torch by the welding power supply.

21. The system of claim 18, comprising a switch configured to switch application of control signals between the integral wire feeder and the portable wire feeder when the portable wire feeder is coupled to the welding power supply.

22. A welding system, comprising:
- a power unit comprising control circuitry configured to control a plurality of wire feeders;
- a wearable wire feeder separate from the power unit, wherein the wearable wire feeder comprises a drive motor configured to supply a welding wire, and the wearable wire feeder excludes any user adjustable controls of the drive motor to adjust a wire feed rate of the welding wire;
- a welding cable configured to extend from the power unit to the wearable wire feeder, wherein the welding cable is configured to supply a welding power and wire feed control signals from the power unit to the wearable wire feeder to control the drive motor;
- a welding torch; and
- a torch cable configured to couple to the wearable wire feeder and the welding torch, wherein the torch cable is configured to convey the welding power and the welding wire to the welding torch.

23. The system of claim 22, wherein at least one of the plurality of wire feeders is mounted to the power unit.

24. A method, comprising:
- receiving a welding wire feed control signal from control circuitry in a power unit at a wearable wire feeder, wherein the control circuitry in the power unit is configured to control a plurality of wire feeders, the wearable wire feeder comprises a drive motor configured to supply a welding wire, and the wearable wire feeder excludes any user adjustable controls of the drive motor to adjust a wire feed rate of the welding wire; and
- driving the welding wire with the drive motor in the wearable wire feeder to a welding torch coupled to the wearable wire feeder by a torch cable in response to the control signal.

25. The method of claim 24, wherein at least one of the plurality of wire feeders is mounted to the power unit.

* * * * *